(12) United States Patent
Dresselhaus et al.

(10) Patent No.: US 7,174,539 B2
(45) Date of Patent: Feb. 6, 2007

(54) PROGRAM COUPLING METHOD

(75) Inventors: Albert Dresselhaus, Schloss Holte (DE); Reinhold Wegener, Rüthen (DE)

(73) Assignee: Wincor Nixdorf International GmbH, Paderborn (DE)

( * ) Notice: Subject to any disclaimer, the term of this patent is extended or adjusted under 35 U.S.C. 154(b) by 729 days.

(21) Appl. No.: 10/332,630

(22) PCT Filed: Jul. 21, 2001

(86) PCT No.: PCT/DE01/02617

§ 371 (c)(1),
(2), (4) Date: Jan. 10, 2003

(87) PCT Pub. No.: WO02/17063

PCT Pub. Date: Feb. 28, 2002

(65) Prior Publication Data
US 2004/0054986 A1 Mar. 18, 2004

(30) Foreign Application Priority Data
Aug. 24, 2000 (EP) .................................. 00118436

(51) Int. Cl.
G06F 9/44 (2006.01)
G06F 9/45 (2006.01)

(52) U.S. Cl. ........................ 717/116; 717/137
(58) Field of Classification Search ................ 717/116, 717/118, 136, 137, 140, 145, 147, 148; 707/10, 707/101, 103 R; 719/330
See application file for complete search history.

(56) References Cited

U.S. PATENT DOCUMENTS

| 5,754,849 | A | * | 5/1998 | Dyer et al. | .................. 707/101 |
| 6,009,517 | A | * | 12/1999 | Bak et al. | .................... 712/245 |
| 6,066,181 | A | * | 5/2000 | DeMaster | .................... 717/148 |
| 6,269,373 | B1 | * | 7/2001 | Apte et al. | ..................... 707/10 |
| 6,601,072 | B1 | * | 7/2003 | Gerken, III | ............. 707/103 R |
| 6,671,853 | B1 | * | 12/2003 | Burkett et al. | .............. 715/513 |
| 2003/0120593 | A1 | * | 6/2003 | Bansal et al. | ................. 705/39 |
| 2005/0229189 | A1 | * | 10/2005 | McManus | .................... 719/330 |

OTHER PUBLICATIONS

Frank Buddrus et al., Cappuccino—A C++ TO java Translator, 1998, ACM Press, pp. 660-665.*
Bartoli A: "A Novel Approach to Marshalling", Software Practice & Experience, GB John Wiley & Sons, Ltd., vol. 27, No. 1, 1997, pp. 63-85.
Maybee M J et al: "Multilanguage Interoperability in Distributed Systems", Proceedings of ICSE-18, Berlin, Germany 1996, pp. 451-463.

* cited by examiner

*Primary Examiner*—Wei Zhen
*Assistant Examiner*—Anna Deng
(74) *Attorney, Agent, or Firm*—Michaud-Duffy Group LLP

(57) ABSTRACT

Method for calling a function in a function-oriented programming language, such as C, from an object-oriented programming language, such as JAVA, where recursive calling of a serialization method (toX) stores the contents of the fields used in the structure in a data string in a linearized order corresponding to a format string, the linearized order having type indicators, and this data string is converted into a memory map of the structure by a packing function, and the function in the function-oriented programming language is called using the memory map as a parameter.

8 Claims, 6 Drawing Sheets

```
56  class myStruc1 {
57      public myInt slf1 = new myInt();
58      public myInt[] slf2 = new myInt[2];
59      public myFloat slf3 = new myFloat();
60      public myStruc2 slf4 = new myStruc2 ();
61      public myStruc1() {
62          for (int i=0; i < 2; ++i) {
63              slf2[i] = new myInt();
64          }
65      }
66      public void show(String id) {
67          slf1.show(id + ".slf1");
68          for (int i=0; i < slf2.length; ++i) {
69              slf2[i].show(id + ".slf2");
70          }
71          slf3.show(id + ".slf3");
72          slf4.show(id + ".slf4");
73      }
74      public String toX() {
75          String buf = slf1.toX();
76          buf += '[';
77          for (int i=0; i < slf2.length; ++i) {
78              buf +=slf2[i].toX();
79          }
80          buf += ']';
81          buf += slf3.toX();
82          buf += slf4.toX();
83          return '{' + buf + '}';
84      }
85      public String fromX(String buf) {
86          buf = buf.substring(1);
87          buf = slf1.fromX(buf);
88          buf = buf.substring(1);
89          for (int i=0; i < slf2.length; ++i) {
90              buf = slf2[i].fromX(buf);
91          }
92          buf = buf.substring(1);
93          buf = slf3.fromX(buf);
94          buf = slf4.fromX(buf);
95          return buf.substring(1);
96      }
97  }
```

FIG. 1

```
1  class myInt {
2      public Integer val = new Integer (0);
3      public void show(String id) {
4          System.out.println(id + ".val=" + val);
5          }
6      public String toX() {
7          return "I" + val + ";";
8          }
9      public String fromX(String buf) {
10         int semi = buf.indexOf(';');
11         try {
12             val   =   val.valueOf(buf.substring(1, semi));
13         } catch(NumberFormatException e) {
14             val = new Integer(0);
15         }
16         return buf.substring(semi+1);
17     }
18  }
```

FIG. 2a

```
20      class myFloat {
21        public Float val = new Float(0.0);
22        public void show(String id) {
23              System.out.println(id + ".val=" + val);
24              }
25              public String toX() {
26                      return "F" + val + ";";
27                      }
28              public String fromX(String buf) {
29                      int semi = buf.indexOf(';');
30                      try {
31                                      val                      =
val.valueOf(buf.substring(1, semi));
32                      } catch(NumberFormException e) {
33                              val = new Float(o.o);
34                      }
35              return buf.substring(semi+1);
36        }
37      }
```

FIG. 2b

```
typedef struct MyStruc2 {
   int s2f1;
   };
```

FIG. 3a

```
40    class myStruc2        {
41       public myInt s2f1 = new myInt();
42       public void show(String id) {
43         s2f1.show(id + ".s2f1");
44       }
45       public String toX() {
46         return '{' + s2f1.toX() + ' }';
47       }
48       public String fromX(String buf) {
49         String cpy = buf.substring(1);
50         cpy = s2f1.fromX(buf);
51             return cpy.substring(1);
52       }
53    }
```

FIG. 3b

```
typedef struct myStruc1 {
        int s1f1;
        int s1f2[2];
        float s1f3;
        myStruc2 s1f4;
        }
```

FIG. 4

```
56  class myStruc1 {
57      public myInt s1f1 = new myInt();
58      public myInt[] s1f2 = new myInt[2];
59      public myFloat s1f3 = new myFloat();
60      public myStruc2 s1f4 = new myStruc2 ();
61      public myStruc1() {
62         for (int i=0; i < 2; ++i) {
63           s1f2[i] = new myInt();
64         }
65      }
66      public void show(String id) {
67         s1f1.show(id + ".s1f1");
68          for (int i=0; i < s1f2.length; ++i) {
69             s1f2[i].show(id + ".s1f2");
70             }
71         s1f3.show(id + ".s1f3");
72         s1f4.show(id + ".s1f4");
73      }
74      public String toX() {
75            String buf = s1f1.toX();
76            buf += '[';
77            for (int i=0; i < s1f2.length; ++i) {
78               buf +=s1f2[i].toX();
79               }
80            buf += ']';
81            buf += s1f3.toX();
82            buf += s1f4.toX();
83            return '{' + buf + '}';
84      }
85      public String fromX(String buf) {
86         buf = buf.substring(1);
87         buf = s1f1.fromX(buf);
88         buf = buf.substring(1);
89          for (int i=0; i < s1f2.length; ++i) {
90               buf = s1f2[i].fromX(buf);
91                                                                    }
92      buf = buf.substring(1);
93      buf = s1f3.fromX(buf);
94      buf = s1f4.fromX(buf);
95      return buf.substring(1);
96      }
97  }
```

FIG. 5

```
101  class CallC {
102      public String execC(String func, String buf) {
103          System.out.println("Calling "+func+": "+buf);
104          int off = buf.indexOf("9876");
105          String mod = buf.substring(0, off)
106                      + 6789
107                      + buf.substring(off+4);
108          System.out.printIn("Modified: " + mod);
109          return mod;
110      }
111  }
```

FIG. 6

```
113  public class sample {
114      private static myStruc1 my1 = new myStruc1();
115      static void myInit() {
116         my1.s1f1.val = new Integer(1234);
117         my1.s1f4.s2f1.val = new Integer(9876);
118         my1.s1f2[0].val = new Integer(11);
119         my1.s1f2[1].val = new Integer(12);
120         my1.s1f3.val = new Float(5.6);
121      }
122      public static void main(String[] params) {
123         System.out.println("begin .");
124         myInit();
125         my1.show("old my1");
126         String flat = my1.toX();
127         flat = new CallC().execC("aFunc", flat);
128         my1.fromX(flat);
129         my1.show("new my1");
130         System.out.println("done.");
131      }
132  }
```

FIG. 7

```
begin .
    old my1.s1f1.val=1234
    old my1.s1f2.val=11
    old my1.s1f2.val=12
    old my1.s1f3.val=5.6
    old my1.s1f4.s2f1.val=9876
    Calling aFunc: {I1234;[I11;I12;]F5.6;{I9876;}}
    Modified: {I1234,[I11;I12;]F5.6;{I6789;}}
    new my1.s1f1.val=1234
    new my1.s1f2.val=11
    new my1.s1f2.val=12
    new my1.s1f3.val=5.6
    new my1.s1f4.s2f1.val=6789
    done.
```

FIG. 8

```
91  void pack_stru(char *fmt, void *stru)
902 {
903   int i, j;
904   for (i=0; i<strlen(fmt); ) {
905     switch fmt [i++] {
906     case 'I': stru = align(stru, 4);
907         sscanf(fmt, "%d;%n", (int *) stru, &j);
908         i += j; stru += 4;
909         break
910     case 'F': stru = align(stru, 8);
911          sscanf(fmt, "%f;%n", (float *) stru, &j);
912             i      +=j;     stru     +=       8;
913          break;
914     case '{': stru = align(stru, 8);
915             break;
916     case '}': stru = align(stru, 8);
917             break;
918     case ']';
919             break;
920     case '[':
921             break;
922       }
923    }
924 }
```

PROGRAM COUPLING METHOD

CROSS-REFERENCE TO RELATED APPLICATIONS

This application is entitled to the benefit of and incorporates by reference essential subject matter disclosed in International Application No. PCT/DE01/02617 filed on Jul. 12, 2001 and European Patent Application No. 00118436.5 filed on Aug. 24, 20000.

FIELD OF THE INVENTION

The invention relates to the coupling of different programming languages, particularly to the calling of subprograms in function-oriented programming languages from object-oriented programming languages, and vice versa.

BACKGROUND OF THE INVENTION

A large number of programming systems are known which can be used to produce programs for data processing installations. Examples used to a large extent and below are the programming languages JAVA and C. The abstract specification of the programming language includes translators, which produce program code. These translators are thus tools which are used to set up the computers to behave in a particular way.

With the introduction of a new programming language, in this case JAVA, the problem always arises of how to call subprograms in the respective other programming language. Generally known techniques convert the calling conventions of various programming language implementations, provided that the programming languages are sufficiently similar. By way of example, joint use of C and Pascal is known, where usually one keyword characterizes the function or procedure as appropriate. So long as a single variable is involved, this technique is simple and familiar. Greater problems arise with the joint use of structures. In this context, the solution normally involves joint representation being possible in the memory and, on the basis of knowledge of the memory structure, a pair of descriptions being produced manually which represent the same memory structure. When coupling object-oriented languages, such as JAVA, and function-oriented languages, such as C, however, particular problems arise if structures are involved. This is so because JAVA does not know any structures like C; the best approximation involves the use of objects, possibly interleaved.

JAVA is already provided with an interface for calling C programs, in particular. This interface is called 'JAVA Native Interface', and is abbreviated to JNI.

Existing C functions for integration with Java programs, the signatures for these C functions will still have to be modified to work with the JNI. It is thus not readily possible to call a prescribed C function from JAVA without producing an auxiliary function, normally called a 'wrapper function', for each function to be called in this manner. In particular, the use of structures in C always needs to be implemented individually in parameter form, since there are no structures in JAVA.

SUMMARY OF THE INVENTION

It is thus an object of the invention to call prescribed C functions whose parameters are prescribed C structures from JAVA without individually and manually producing a 'wrapper function' for each C function and C structure.

The solution to this object is now described using an example which continues to use the programming languages JAVA and C. At the start of a line, the programs shown contain a line number which is merely used for reference.

In this context, the solution uses a technique called Serialization.

In this case, each class respectively contains a method for serialization and one for the opposite direction. According to convention, the serialization method is called 'writeObject' and is applied recursively to all data elements in a class. In this context, recursion is undertaken by the runtime system 'JAVA Virtual Machine', which dynamically, i.e. not until during the runtime, ascertains the fields to be processed from the objects to be serialized, outputs them canonically if basic types are involved, and, if they are references to objects, handles them recursively.

BRIEF DESCRIPTION OF THE DRAWINGS

FIG. 1 defines the 'Integer' type and 'Float' type classes

FIG. 2*a* defines the class 'myFloat'

FIG. 2*b* defines a simple structure MyStruc2 in C

FIG. 3*a* defines MyStruc2 converted into JAVA class

FIG. 3*b* defines a complex structure in C

FIG. 4 defines a JAVA equivalent of the complex structure of FIG. 3*b*

FIG. 5 defines the class 'CallC' containing the method 'execC'

FIG. 6 defines the class 'sample'

FIG. 7 defines program lines 1 to 132 combined into one JAVA program FIG. 8 defines an example of a packing function.

DETAILED DESCRIPTION OF THE INVENTION

The text below first uses a simple example to describe a serialization operation, as used in the invention. The basic elements used are a whole number of the 'Integer' type and a floating decimal point number of the 'Float' type. Both are defined as classes as shown in FIG. 1.

In line 1, the class 'myInt' is defined by the subsequent program text. In line 2, it comprises a memory location 'val' from the 'Integer' class. Each class in this application knows three methods, namely 'show' in line 3, 'toX' in line 6 and 'fromX' in line 9. 'show' is used only to indicate the value for test purposes.

The method 'toX' is used for serialization. It returns the value, as a string, in a canonical form which involves an indicator, in this case "I", being followed by the value in decimal numbers, which is ended by a semicolon.

The method 'fromX' expects a string which starts with an element in precisely this format, i.e. with an indicator, which should always be "I", with the value in decimal numbers and with a semicolon. The position of the latter is ascertained in line 10. 'fromX' returns the remainder of the character string after the value for the object has been removed and stored in 'val'.

The two functions 'toX' and fromX' are therefore the inverse of one another; in particular, x.fromX(x.toX( )), where x is an object in the 'myInt' class, prompts the value to be read by 'toX' and to be set again by 'fromX'.

The class 'myFloat' is defined in a similar manner as shown in FIG. 2a.

Assumption: there is a simple structure in C as shown in FIG. 2b.

This is converted into the following JAVA class as shown in FIG. 3a.

In line 41, the data field s2f1 is defined; the method 'show' is used to indicate the value.

The method 'toX' produces the value, enclosed in curly brackets, as a string. 'fromX' provides the return path. Both methods, and also the method 'show', use recursive calling in order to execute the appropriate functions for the structure elements.

These elements are now used to build a somewhat more complex structure in C as shown in FIG. 3b.

typedef struct myStruc1 {
  int s1f1;
  int s1f2[2];
  float s1f3;
  myStruc2 s1f4;
}

The corresponding JAVA equivalent is shown in FIG. 4.

For each field of the structure, the methods 'toX' and 'fromX' use recursive calling of the fields' corresponding methods to achieve conversion to and from a canonical linear representation. For the array 's1f2' iteration needs to be performed as appropriate over the elements, as is done in lines 78 and 90. In this case too, the structure is marked by curly brackets; the array is enclosed in square brackets.

In addition, another class 'CallC' is provided for this Example as shown in FIG. 5.

This class merely contains the method 'execC', which indicates the arguments and modifies the transferred character string by replacing the number "9876" with "6789". This method is representative of a call to a function in C, as explained in more detail later.

To be able to execute this JAVA code for the purpose of demonstration, another main program 'main' is defined in the class 'sample' as shown in FIG. 6.

In this case, the object 'my1' in the class 'myStruc1' is first filled with example values in lines 115–121. In this case, for the sake of clarity, this is done by directly accessing the fields of the objects. In a realistic application, suitable methods would be used for this, the formulation of which is dependent on the contents of the application, however, and is therefore of no significance in this case.

In line 124, the object created in line 114 is initialized. In line 125, the values are indicated. In line 126, the object is produced by—recursively—calling 'toX' in the variable 'flat' as a canonical linear representation. In line 127, the method 'execC' is called, which is normally called as a C function using JNI but in this case is simulated using a JAVA class and returns a possibly altered structure in linearized normal form which remains in the variable 'flat'. Using this string, these, possibly altered, values are now stored in the objects by—recursively—calling 'fromX'.

It is clear that the function 'toX' recursively builds the string, and 'fromX' dismantles it in the same way.

As is evident, the methods 'fromX' and 'toX' can be produced automatically from the appropriate structure definitions by a program. For each element, the respective method is recursively called. In the case of 'toX', its output is appended to the string; in the case of 'fromX', its result represents the remainder which is to be processed further.

If all the program lines from 1 to 132 are combined into one JAVA program and this program is translated and executed, then the output shown in FIG. 7 is produced.

This clearly shows the canonical representation "{I1234 [I11;I12;]F5.6;{I9876;}}" both of the structure and of the values of the object 'myStruc1' in accordance with the C structure 'myStruc1'.

Up to now, however, the format indicators "I", "F", "{" and "}" have not been used at all. In this case, the semicolon has been added only for the sake of clarity; it could be omitted. Other representations of the string are also possible. Since strings are stored in JAVA as Unicode with 16 bits per character, and the methods of the "string" class are not necessarily very fast, optimization could involve using a previously produced byte array and filling it with binary data. Also, it goes without saying that instead of the base 10 numerical representation, a base 16 or 36 numerical representation is also possible. Whether such optimizations have any worth in relation to the loss of portability and maintainability needs to be established and decided specifically by means of measurements in each individual case. These and similar optimizations, which are known to a person skilled in the art anyway, are therefore not mentioned further below.

The effect achieved by the means illustrated up to now is thus that the method 'toX' has made all data fields available in linearized form, and they can be stored again using the method 'fromX'. These methods thus represent a specific form of the known serialization functions and could even replace them.

In contrast to the serialization function already known from JAVA, however, it is first necessary to state that the serialization function used in the present invention produces a particular order for the fields, namely the order in which the fields are defined in the structure. In addition, the serialization represents the format of the structure in accordance with the functional language C in a very simple form. By contrast, although the serialization already provided in JAVA stores information about the objects, it naturally does not contain structure information regarding the associated C structures.

This linearized form of content storage provided with type indicators can now be converted, irrespective of the definition of the structures, into a memory layout which corresponds to the respective C structure. To this end, a C program is used which—preferably also recursively—analyzes the character string, evaluates the type indicator and processes it further as appropriate. If the type indicator characterizes a single variable, then the subsequent numbers are converted and are stored in binary form in a memory array of the appropriate length and alignment. If the type indicator characterizes a structure, then some implementations will require alignment, frequently with a double-word limit, even if the structure only comprises bytes which require no alignment. This processing is specific to the respective compiler system for the C language and corresponds to the techniques sufficiently well known from the compiler construction, which are possibly transferred from the corresponding compiler's source code.

An example of a packing function could have the shown in FIG. 8.

The function 'pack_stru' has two parameters, a pointer to the combined format and data string and the pointer to a memory area (of sufficient size) in which the structure needs to be set up. This memory area is defined, independently of type, as 'void*'. The loop from line 904 to line 923 now executes the combined format and data string. The 'align' function in lines 906, 910, 914 and 916, which aligns the address with a multiple of the second parameter, is not shown in this case, since it is highly dependent on the respective compiler system. In lines 907 and 911, the library function 'sscanf' is used to remove the value from the string 'fmt' and to store it in the memory area addressed by the pointer 'stru', with type adjustment being carried out here for the sake of formal correctness. The number of processed characters is output and is used to advance the format and data string. The 'array' indictors '[' and ']' have no effect in this case; this is also dependent on the respective implementation.

Hence, as indicated by the method 'execC' from the class 'CallC', the name of the C function to be called and a character string containing, in coded form, the structure to be disclosed to the C function are transferred. The method 'execC' is called as a C function using the JNI and then converts the character string, as illustrated, into the storage format corresponding to the structure. The C function indicated in the first parameter is then called and a pointer to the memory structure is transferred.

As the result following return of the function, the fields of the memory structure can be changed. The function 'execC' therefore produces the canonical representation from the memory structure again. To this end, the transferred character string, which describes the memory structure, of course, is used and is processed again. The type indicators are copied and the value of the memory location is then added, and the available value replaced, respectively. The advancement in the memory address is effected according to the same rules for length and alignment as when it is produced. If the numerical values are stored with a fixed (maximum) length, then it is simply a matter of overwriting.

The function 'execC' thus returns the linearized representation of the values of the memory structure. This is then subsequently recursively analyzed again using the method 'fromX' and is used to update the values of the fields in the objects.

In the example illustrated up to now, the type indicators and the values are stored as a mixture in the same string. It is naturally also possible for the two to be produced separately in two strings.

{I1234; [I11;I12;]F5.6;{I9876;}} then gives the format string

{I[II]F{}} and the data string

1234;11;12;5.6;9876;

This has the advantage that, following return of the called function, the function or method 'execC' merely need use the coded structure description "{I[II]F{}}" to assemble the values of the structure elements as a new character string and, to this end, the buffer which contained the input values can be overwritten from the start. For the rest, the structure information can also be provided statically in this case. This is the case particularly when, as preferred and illustrated above, the serialization and deserialization methods 'toX' and 'fromX' are produced automatically from the description of the C structure. This makes production of the data string more efficient.

The method described can also be used to call a JAVA method from a C function. To this end, the format string can either be provided statically or can be produced on an ad hoc basis by calling the serialization method. In the latter case, priority must be given to instantiating and initializing the necessary objects. Using the format string, the C structure can now be converted into the serial form by the unpacking function. This is the latest point at which the necessary objects can be instantiated and initialized. The calls required for this purpose are provided in the JNI. Likewise, means provided in the JNI are first used to call the deserialization method 'fromX' for the object corresponding to the structure and then the JAVA method which ultimately needs to be called for any object which is primarily independent of the objects associated with the structures. Following return, the corresponding operation will generally be executed inversely or in line with the first part when calling C from JAVA.

What is claimed is:

1. A method for calling a function in a function-oriented programming language (C), where the function expects a structure as a parameter, from an object-oriented programming language (JAVA), where the fields of the structure have associated corresponding classes in JAVA, having the following steps:

a character string describing the structure is provided in a format string, recursive calling of a serialization method (toX) removes the contents of the fields used in the structure and stores them in a data string in a linearized order corresponding to the format string, the linearized order having type indicators, a packing function converts the data string into a memory map of the structure using the format string, the function in the function-oriented programming language is called using the memory map as a parameter for the structure.

2. The method as claimed in claim 1, having the following further steps:

an unpacking function converts the memory map into a data string using the format string, recursive calling of a deserialization method (fromX) removes the fields used in the structure from the data string in a linearized order corresponding to the format string and stores them in the fields of the objects, the linearized order having type indicators.

3. The method as claimed in claim 1, where the data string and the format string are mixed to form a joint string which is produced using the serialization method.

4. A method for calling a function in an object-oriented programming language (JAVA) in the form of a function in a function-oriented programming language (C), where a structure is transferred as a parameter in the function call and fields of the structure have associated corresponding classes in JAVA, having the following steps:

an object corresponding to the structure, including necessary subobjects, is produced, a character string describing the structure is provided in a format string, an unpacking function converts a memory map into a data string using the format string, recursive calling of a deserialization method (fromX) removes the fields used in the structure from the data string in a linearized order corresponding to the format string and stores them in fields of the objects, the linearized order having type indicators, the function is called.

5. The method as claimed in claim 4, having the following further steps:

recursive calling of a serialization method (toX) removes the contents of the fields used in the structure and stores them in a data string in a linearized order corresponding to the format string, the linearized order having type indicators, a packing function replaces the fields from the values in the data string using the format string in the memory map of the structure.

6. The method as claimed in claim 1, in which at least program text of the serialization method is produced from the structure described in the function-oriented programming language.

7. The method as claimed in claim 2, in which at least program text of the deserialization method is produced from the structure described in the function-oriented programming language.

8. The method as claimed in claim 4, in which at least program text of the deserialization method is produced from the structure described in the function-oriented programming language.

* * * * *